(12) United States Patent
Tsai et al.

(10) Patent No.: US 11,099,423 B2
(45) Date of Patent: Aug. 24, 2021

(54) WIDE VIEWING ANGLE DISPLAY DEVICE

(71) Applicant: Au Optronics Corporation, Hsinchu (TW)

(72) Inventors: Zong-Huei Tsai, New Taipei (TW); Yu-Wen Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 232 days.

(21) Appl. No.: 16/214,154

(22) Filed: Dec. 10, 2018

(65) Prior Publication Data

US 2020/0033677 A1    Jan. 30, 2020

(30) Foreign Application Priority Data

Jul. 25, 2018   (TW) ................................ 107125700

(51) Int. Cl.
| | |
|---|---|
| *G02F 1/1335* | (2006.01) |
| *G02F 1/13357* | (2006.01) |
| *G02B 5/02* | (2006.01) |
| *G02F 1/13* | (2006.01) |
| *G02F 1/1334* | (2006.01) |

(52) U.S. Cl.
CPC ......... *G02F 1/133602* (2013.01); *G02B 5/02* (2013.01); *G02F 1/1323* (2013.01); *G02F 1/1334* (2013.01); *G02F 1/133504* (2013.01); *G02F 1/133528* (2013.01)

(58) Field of Classification Search
CPC .............................................. G02F 1/133602
See application file for complete search history.

(56) References Cited

U.S. PATENT DOCUMENTS

2006/0268407 A1* 11/2006 Fergason ............. H04N 13/339
                                                        359/485.02
2017/0329073 A1* 11/2017 Liu ...................... G02B 6/0053
2018/0246371 A1*  8/2018 Szwarcman ........... G02B 5/201

FOREIGN PATENT DOCUMENTS

| CN | 202747156 | 2/2013 |
|---|---|---|
| CN | 107908053 | 4/2018 |
| TW | M259925 | 3/2005 |
| TW | 201035634 | 10/2010 |
| TW | 201823819 | 7/2018 |

* cited by examiner

*Primary Examiner* — James A Dudek
(74) *Attorney, Agent, or Firm* — JCIPRNET (57) ABSTRACT

A display device includes a backlight module, a liquid crystal display panel and an optical module. The liquid crystal display panel is disposed on the backlight module. The liquid crystal display panel includes an array substrate, an opposite substrate, a display medium layer, an upper polarizing pattern, and a lower polarizing pattern. The upper polarizing pattern is disposed on the opposite substrate. The lower polarizing pattern is disposed on the array substrate and has a first transmission axis. The optical module is disposed between the backlight module and the liquid crystal display panel. The optical module includes a dual brightness enhancement film. The dual brightness enhancement film has a second transmission axis. The polarization direction of the light after passing through the optical module is different from the polarization direction of the light after passing through the lower polarizing pattern.

8 Claims, 10 Drawing Sheets

WIDE VIEWING ANGLE DISPLAY DEVICE

CROSS REFERENCE TO RELATED APPLICATION

This application claims the priority benefit of Taiwan application serial no. 107125700, filed on Jul. 25, 2018. The entirety of the above-mentioned patent application is hereby incorporated by reference herein and made a part of specification.

BACKGROUND

Technical Field

The disclosure relates to a wide viewing angle display device, and particularly relates to a display device including a dual brightness enhancement film.

Description of Related Art

Since the advent of liquid crystal display devices, its light, thin, short, and small appearance, in line with the design requirements for thinner and lighter appearance of display devices, makes it one of the most important display devices on the market today.

However, liquid crystal display device is a non-self-luminous display device, limited by its illumination principle, there are still some problems in the liquid crystal display device that need to be improved. For example, the viewing angle of the liquid crystal display device is too narrow, therefore, the display quality of the liquid crystal display device is prone to decline when the angle of the viewing direction is too large. For example, the contrast, color saturation, and brightness of the liquid crystal display device decrease as the angle of the viewing direction increases. Therefore, there is a need for a way to solve the aforementioned problems.

SUMMARY

The disclosure provides a display device with a display characteristics of wide viewing angle, capable of mitigating the problem that the display quality goes down when the angle of the viewing direction is too large.

At least one embodiment of the present disclosure provides a display device, including a backlight module, a liquid crystal display panel and an optical module. The liquid crystal display panel is located on the backlight module. The liquid crystal display panel includes an array substrate, an opposite substrate, a display medium layer, an upper polarizing pattern, and a lower polarizing pattern. The display medium layer is located between the array substrate and the opposite substrate. The upper polarizing pattern is located on the opposite substrate. The lower polarizing pattern is located on the array substrate and having a first transmission axis. The optical module is located between the backlight module and the liquid crystal display panel. The optical module includes a dual brightness enhancement film. The dual brightness enhancement film has a second transmission axis, wherein the first polarization direction of the light after passing through the optical module is different from the second polarization direction of the light after passing through the lower polarizing pattern.

Another embodiment of the present disclosure provides a display device, including a display panel, a polarizing pattern, an optical module. The polarizing pattern is located on the display panel and has a first transmission axis. The optical module is located between the display panel and the polarizing pattern, the first polarization direction of the light after passing through the optical module is different from the second polarization direction of the light after passing through the polarizing pattern. The optical module includes a polarizer and a polarization conversion layer. The polarizer has a second transmission axis, and the polarizer is a dual brightness enhancement film or a polarizing film. The polarization conversion layer has a first refractive index for light in a polarization direction parallel to a first direction, and has a second refractive index for light in a polarization direction parallel to a second direction, the first direction is perpendicular to the second direction, and the first refractive index is greater than the second refractive index.

To make the aforementioned features and advantages more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
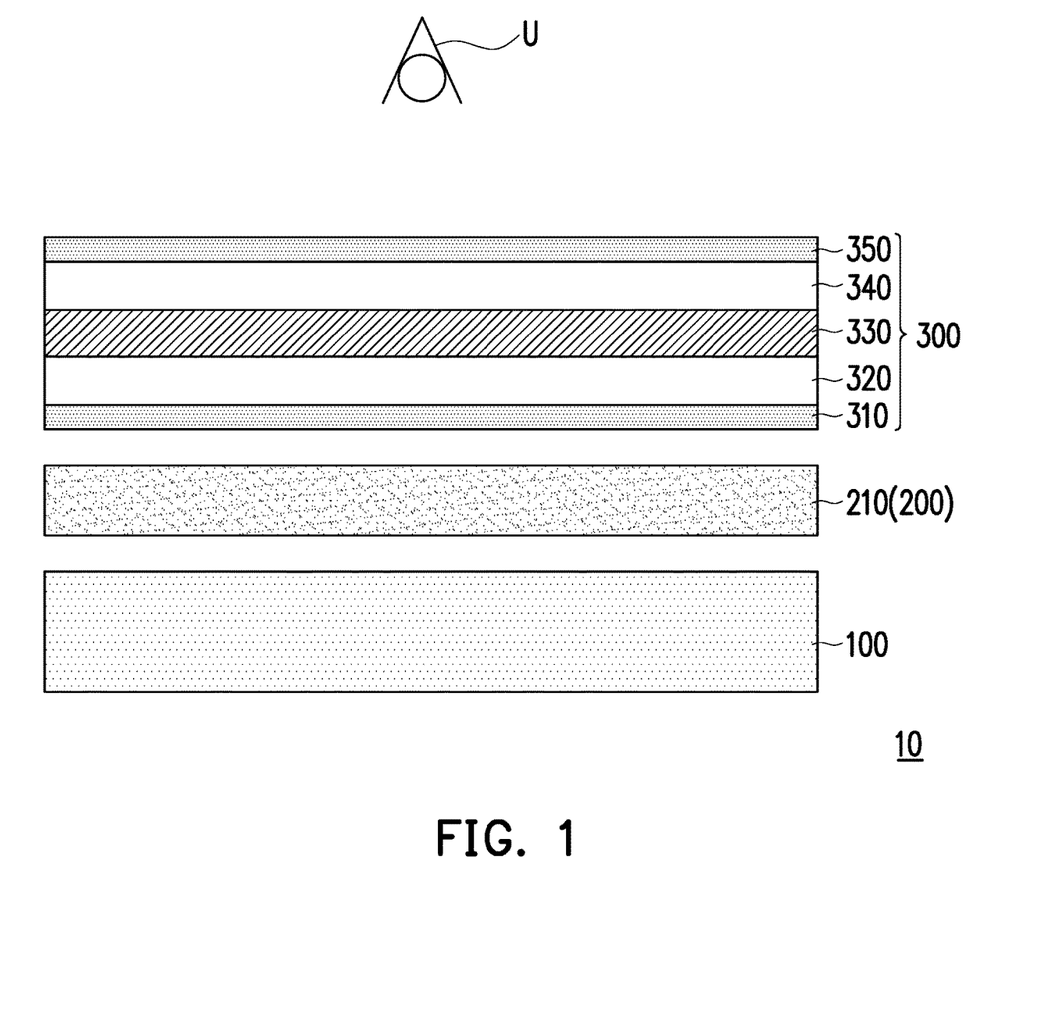
FIG. 1 is a cross-sectional schematic view of a display device in accordance with an embodiment of the present disclosure.
Figure 2:
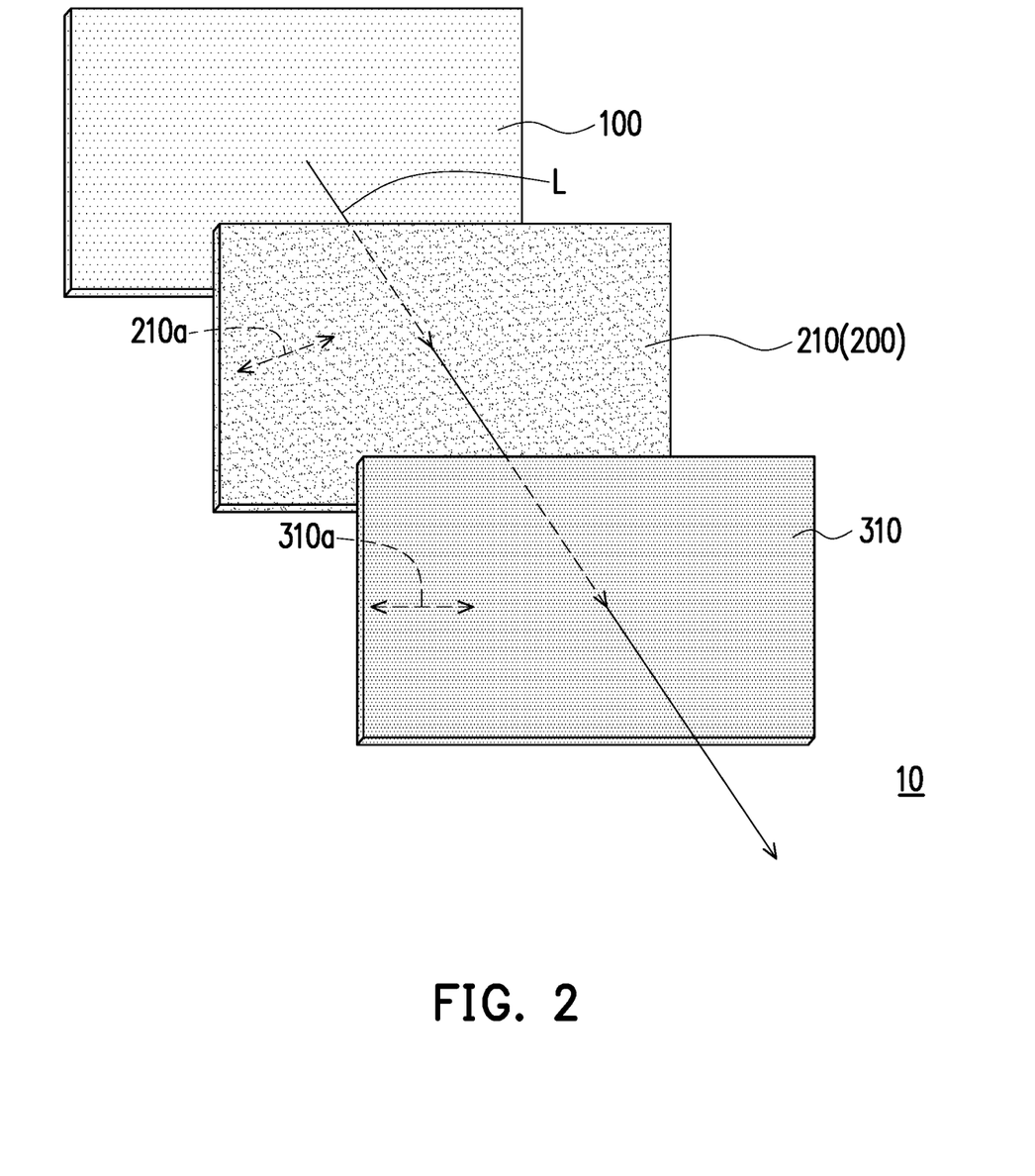
FIG. 2 is an exploded view of a portion of the display device of FIG. 1.

FIG. 1 is a cross-sectional schematic view of a display device in accordance with an embodiment of the present disclosure. FIG. 2 is an exploded view of a portion of the display device of FIG. 1.

Please refer to FIG. 1 and FIG. 2, the display device 10 includes a backlight module 100, a liquid crystal display panel 300, and an optical module 200. The optical module 200 is located between the backlight module 100 and the liquid crystal display panel 300. In other words, the liquid crystal display panel 300 is located on the backlight module 100, such that the liquid crystal display panel 300 faces the viewer U, and the rear surface of the liquid crystal display panel 300 faces the backlight module 100.

In this embodiment, the liquid crystal display panel 300 includes an array substrate 320, an opposite substrate 340, a display medium layer 330, an upper polarizing pattern 350, and a lower polarizing pattern 310. In FIG. 1, the upper polarizing pattern 350 is located on the opposite substrate 340, the lower polarizing pattern 310 is located on the array substrate 320, and the display medium layer 330 is located between the array substrate 320 and the opposite substrate 340. In particular, the upper polarizing pattern 350 and the display medium layer 330 are respectively located on opposite surfaces (opposite sides) of the opposite substrate 340, however, the disclosure is not limited thereto, for example, the upper polarizing pattern 350 is also disposed on the inner surface of the opposite substrate 340, such that the upper polarizing pattern 350 and the display medium layer 330 are located on the same side of the opposite substrate 340, in this way, the upper polarizing pattern 350 is located between the opposite substrate 340 and the display medium layer 330. Similarly, in the embodiment of FIG. 1, the lower polarizing pattern 310 and the display medium layer 330 are also located on opposite sides of the array substrate 320, however, the disclosure is not limited thereto. For example, the lower polarizing pattern 310 and the display medium layer 330 are also located on the same side of the array substrate 320, that is, the lower polarizing pattern 310 is also disposed on the inner surface of the array substrate 320, such that the lower polarizing pattern 310 is located between the array substrate 320 and the display medium layer 330. In this embodiment, the array substrate 320 and the opposite substrate 340 are fixed together by, for example, a sealant, however, the disclosure is not limited thereto.

In this embodiment, the array substrate 320 includes a pixel array, which includes a plurality of active components, a plurality of pixel electrodes, a plurality of scan lines, and a plurality of data lines. In some embodiments, the array substrate 320 further includes a common electrode, in other words, the array substrate 320 control the rotation of the liquid crystal by using fringe field switching (FFS) or in-plane switching (IPS) technology, however, the disclosure is not limited thereto. In other embodiments, the common electrode is located in the opposite substrate 340.

In this embodiment, the opposite substrate 340 includes, for example, a color filter element and a black matrix substrate, however, the disclosure is not limited thereto. In some embodiments, the color filter element is located in the array substrate 320 to form a structure of color filter on array (COA).

Please refer to the embodiment of FIG. 1, the optical module 200 includes a dual brightness enhancement film (DBEF) 210. The dual brightness enhancement film 210 includes, for example, a plurality of polymer film layers having birefringence characteristics overlapping each other. In particular, the dual brightness enhancement film 210 reflects the polarized light in the non-penetrating direction back to the backlight module 100. In some embodiments, the backlight module 100 has the functions of light diffusion and light scrambling, therefore, a portion of the polarized light which is originally in the non-penetrating direction can be converted into the polarized light in the penetrating direction, and reflected again to the dual brightness enhancement film 210. Through repeated reflections, most of the light emitted by the backlight module 100 can be converted into effective light that can pass through the dual brightness enhancement film 210, further increasing the brightness of the display device.

In detail, as shown in FIG. 2, the lower polarizing pattern 310 has a first transmission axis 310a, the dual brightness enhancement film 210 has a second transmission axis 210a, and the upper polarizing pattern 350 has a third transmission axis (not shown), wherein the axial direction of the first transmission axis 310a of the lower polarizing pattern 310 is, for example, orthogonal to the axial direction of the third transmission axis of the upper polarizing pattern 350. In this embodiment, the axial direction of the first transmission axis 310a is different from the axial direction of the second transmission axis 210a, therefore, the first polarization direction, which is a polarization direction of the light L emitted by the backlight module 100 after passing through the optical module 200, is different from the second polarization direction, which is a polarization direction of the light L after passing through the lower polarizing pattern 310. In other words, a first polarization direction of a light after passing through the optical module is different from a second polarization direction of a light after passing through the lower polarizing pattern. In some embodiments, the angle between the second transmission axis 210a and the first transmission axis 310a is 5 degrees to 50 degrees.

Based on the above, the polarization direction of the light L emitted by the backlight module 100 after passing through the optical module 200 is different from the polarization direction of the light L after passing through the lower polarizing pattern 310, affecting the transmittance of the display device 10 in the front view direction, reducing the brightness of the display device 10 in the front view direction, and the aforementioned effects would gradually decrease as the angle of the viewing direction increases, which makes the display quality of the display device 10 in large angle of the viewing direction less different from the display quality in the front view direction, thereby obtaining the characteristic of a wide viewing angle.

Figure 3:
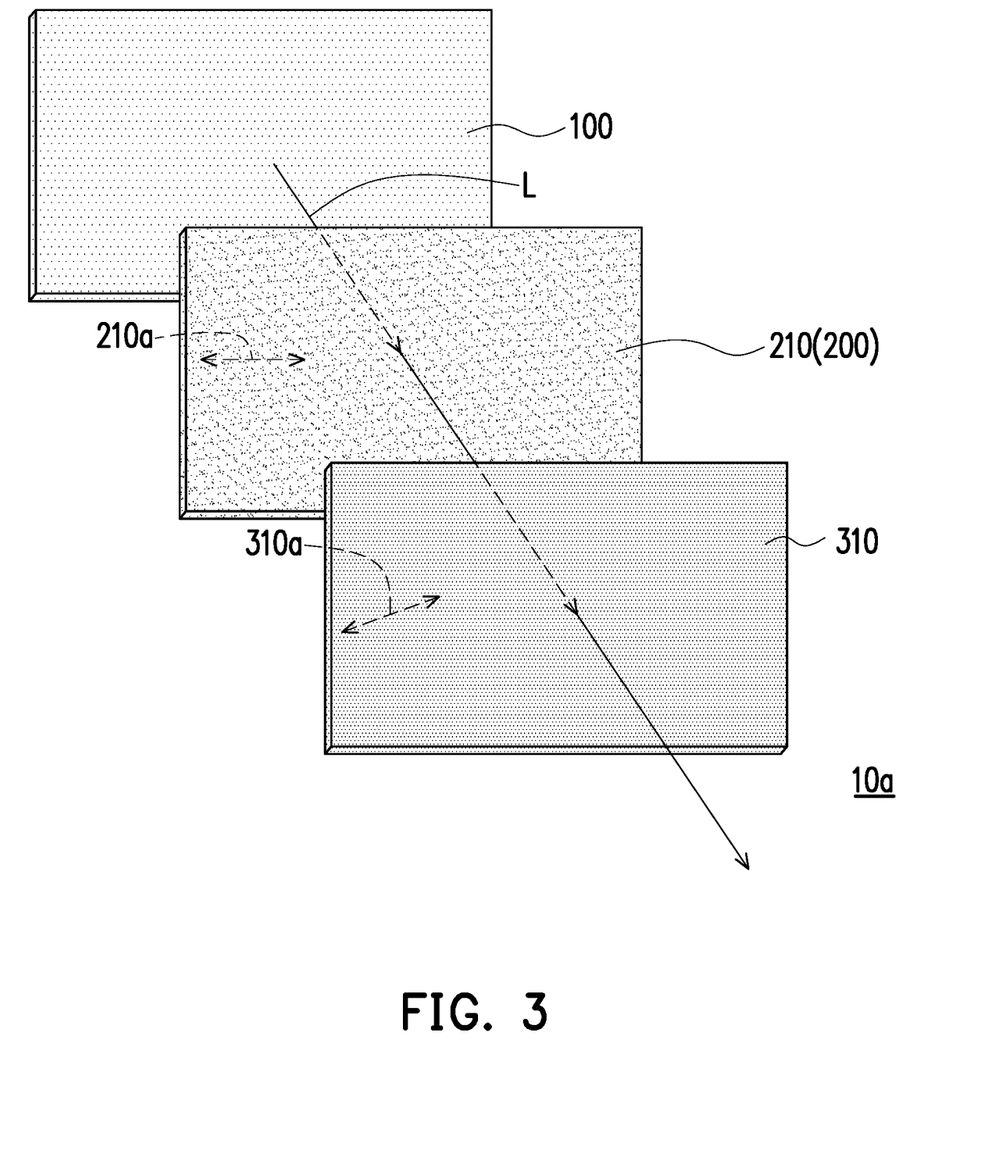
FIG. 3 is an exploded view of a portion of a display device in accordance with an embodiment of the present disclosure.

FIG. 3 is an exploded view of a portion of a display device in accordance with an embodiment of the present disclosure. It should be noted that the embodiment of FIG. 3 adopts the reference numerals and part of the technical content from the embodiment of FIGS. 1 and 2, wherein the same or similar reference numerals refer to the same or similar elements, and the repeated description of the same technical content is omitted. For the description of the omitted part, reference may be made to the foregoing embodiment, which will not be described herein.

The main difference between the display device 10a of FIG. 3 and the display device 10 of FIGS. 1 and 2 is that the axial direction of the first transmission axis 310a of the display device 10a is different from the axial direction of the first transmission axis 310a of the display device 10.

In this embodiment, the axial direction of the first transmission axis 310a of the lower polarizing pattern 310 is adjusted such that the axial direction of the first transmission axis 310a is different from the axial direction of the second transmission axis 210a. For example, the second transmission axis 210a of the dual brightness enhancement film 210 is approximately parallel to the long side of the display device 10a, while the first transmission axis 310a is not parallel to the long side of the display device 10a.

Figure 4:
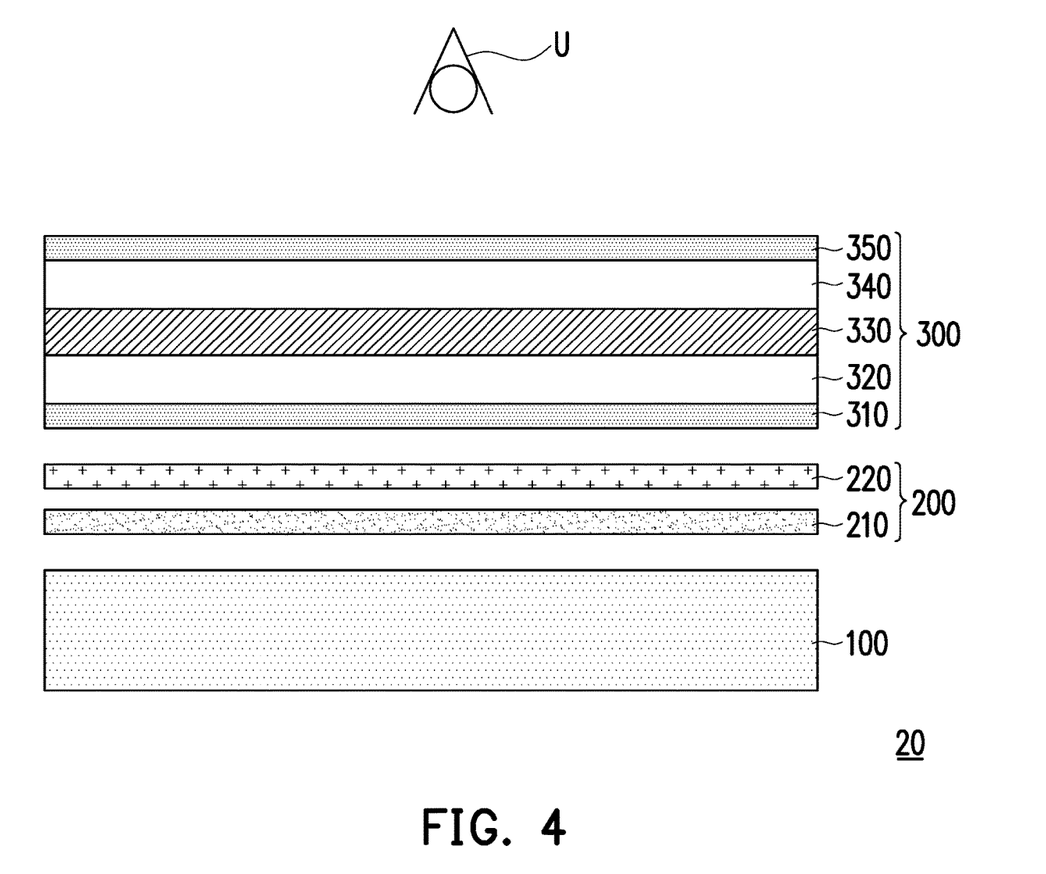
FIG. 4 is a cross-sectional schematic view of a display device in accordance with an embodiment of the present disclosure.
Figure 5:
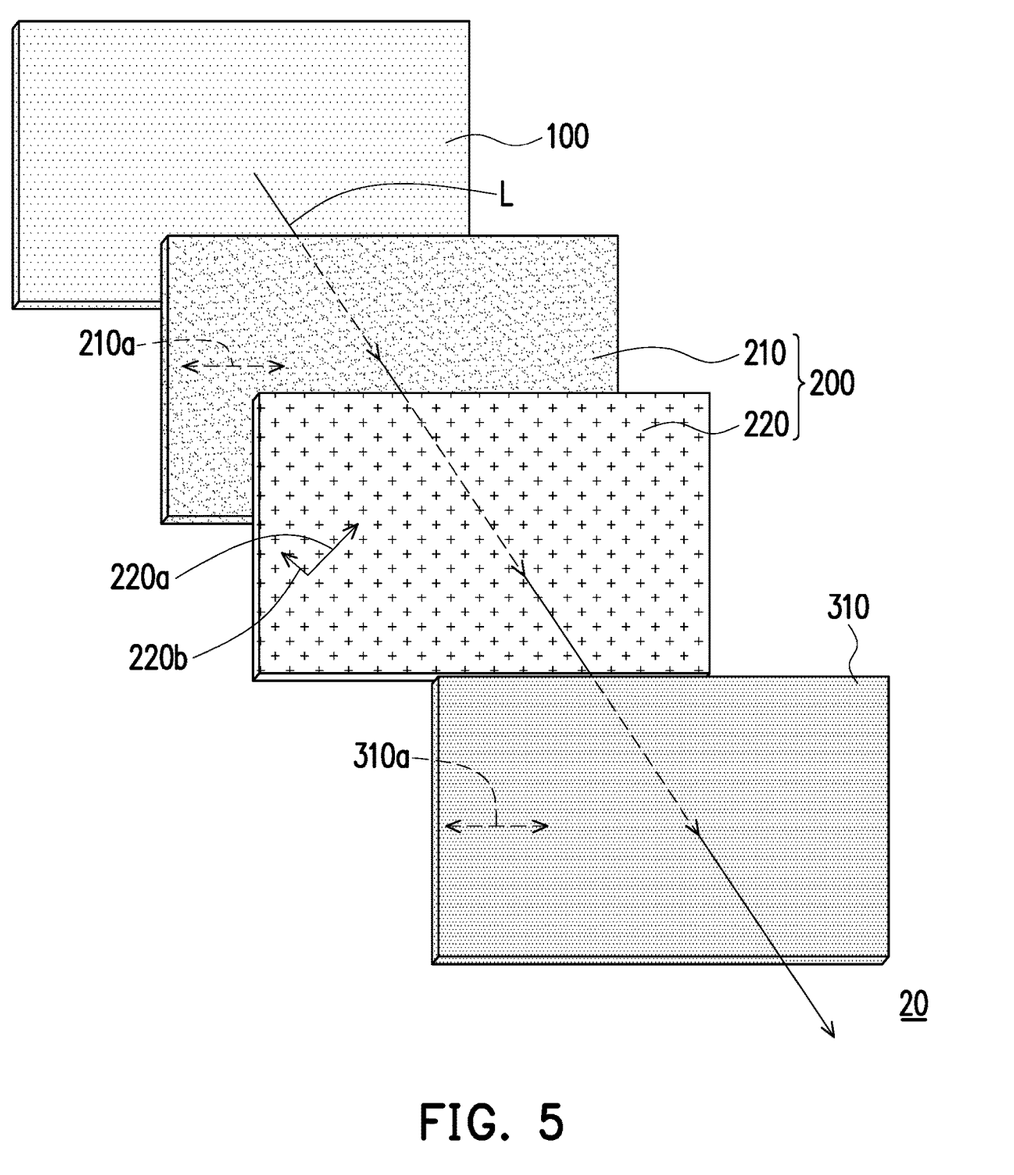
FIG. 5 is an exploded view of a portion of the display device of FIG. 4.

FIG. 4 is a cross-sectional schematic view of a display device in accordance with an embodiment of the present disclosure. FIG. 5 is an exploded view of a portion of the display device of FIG. 4. It should be noted that the embodiment of FIGS. 4 and 5 adopt the reference numerals and part of the technical content from the embodiment of FIGS. 1 and 2, wherein the same or similar reference numerals refer to the same or similar elements, and the repeated description of the same technical content is omitted. For the description of the omitted part, reference may be made to the foregoing embodiment, which will not be described herein.

The main difference between the display device 20 of FIGS. 4 and 5 and the display device 10 of FIGS. 1 and 2 is that the optical module 200 of the display device 20 further includes a polarization conversion layer 220.

Please refer to FIG. 4 and FIG. 5, the angle between the second transmission axis 210a of the dual brightness enhancement film 210 and the first transmission axis 310a of the lower polarizing pattern 310 is less than 5 degrees, for example, the second transmission axis 210a of the dual brightness enhancement film 210 is substantially parallel to the first transmission axis 310a of the lower polarizing pattern 310.

In this embodiment, the polarization conversion layer 220 is located between the liquid crystal display panel 300 and the dual brightness enhancement film 210, more specifically, the polarization conversion layer 220 is disposed between the lower polarizing pattern 310 and the dual brightness enhancement film 210. The polarization conversion layer 220 has a first refractive index n1 for light in a polarization direction parallel to the first direction 220a, and has a second refractive index n2 for light having a polarization direction parallel to the second direction 220b, wherein the first direction 220a is perpendicular to the second direction 220b, and the first refractive index n1 is greater than the second refractive index n2.

In some embodiments, the angle between the first direction 220a and the first transmission axis 310a is 12 degrees to 85 degrees or 95 degrees to 168 degrees, preferably 25 degrees to 73 degrees or 107 degrees to 155 degrees, for example, preferably 60 degrees, more preferably 31 degrees to 58 degrees or 122 degrees to 149 degrees, for example, more preferably 33 degrees.

Since the polarization conversion layer 220 has different relative refractive indices for light in different polarization directions, the polarization conversion layer 220 is used to change the polarization direction of the light L, such that the first polarization direction, which is a polarization direction of the light L after passing through the optical module 200, is different from the second polarization direction, which is a polarization direction of the light L after passing through the lower polarizing pattern 310. In other words, a first polarization direction of a light after passing through the optical module is different from a second polarization direction of a light after passing through the lower polarizing pattern. In this embodiment, the angle between the second transmission axis 210a of the dual brightness enhancement film 210 and the first transmission axis 310a of the lower polarizing pattern 310 is less than 5 degrees, so that the brightness of the center point of the display device 20 can be made brighter.

Figure 6:
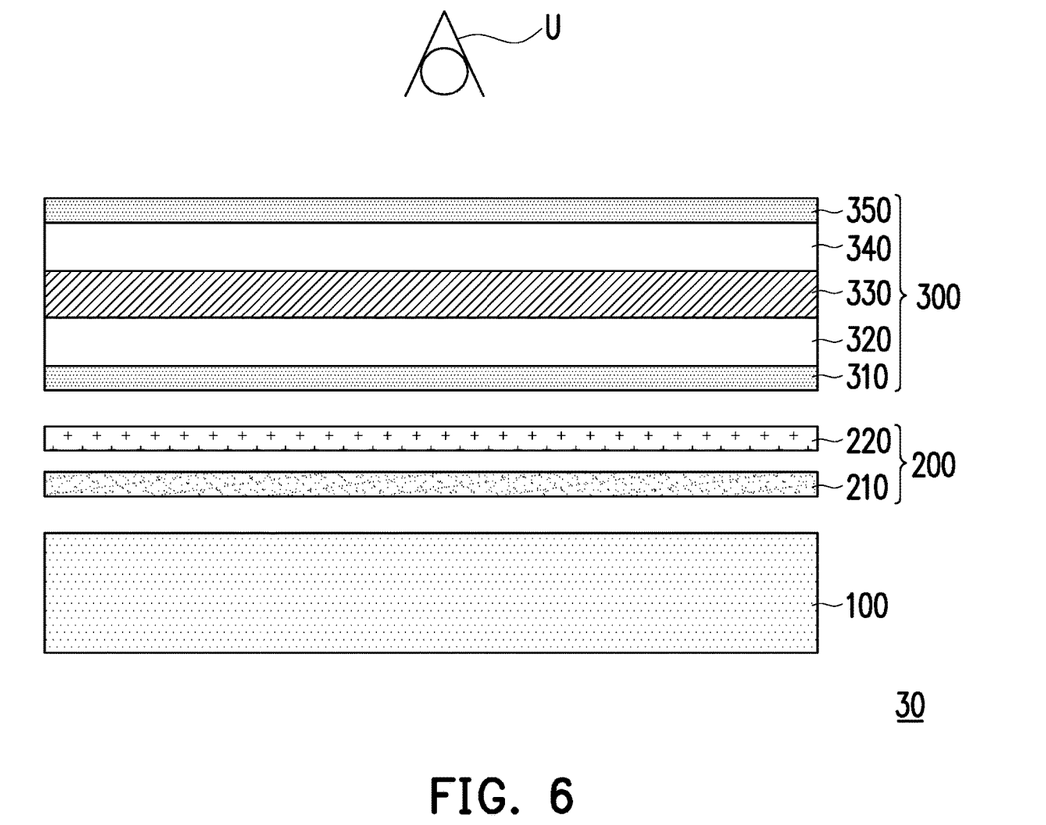
FIG. 6 is a cross-sectional schematic view of a display device in accordance with an embodiment of the present disclosure.
Figure 7:
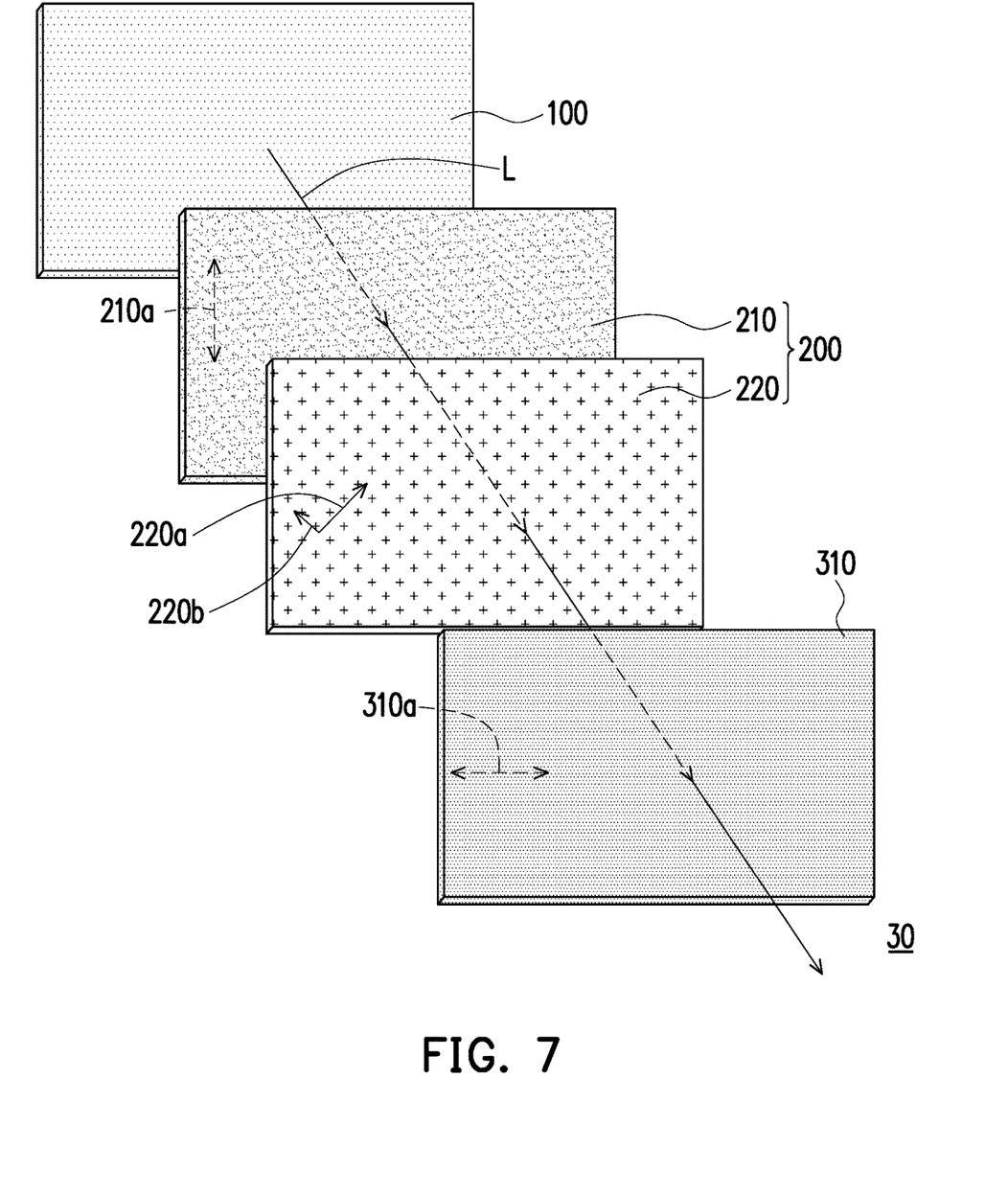
FIG. 7 is an exploded view of a portion of the display device of FIG. 6.

FIG. 6 is a cross-sectional schematic view of a display device in accordance with an embodiment of the present disclosure. FIG. 7 is an exploded view of a portion of the display device of FIG. 6. It should be noted that the embodiment of FIGS. 6 and 7 adopt the reference numerals and parts of the technical content from the embodiment of FIGS. 4 and 5, wherein the same or similar reference numerals refer to the same or similar elements, and the repeated description of the same technical content is omitted. For the description of the omitted part, reference may be made to the foregoing embodiment, which will not be described herein.

The main difference between the display device 30 of FIGS. 6 and 7 and the display device 10 of FIGS. 4 and 5 is that the angle between the second transmission axis 210a and the first transmission axis 310a of the display device 30 is greater than 85 degrees.

Please refer to FIG. 6 and FIG. 7, the angle between the second transmission axis 210a of the dual brightness enhancement film 210 and the first transmission axis 310a of the lower polarizing pattern 310 is greater than 85 degrees, for example, the second transmission axis 210a of the dual brightness enhancement film 210 is substantially perpendicular to the first transmission axis 310a of the lower polarizing pattern 310.

In the embodiment, the polarization conversion layer 220 is located between the liquid crystal display panel 300 and the dual brightness enhancement film 210, more specifically, the polarization conversion layer 220 is disposed between the lower polarizing pattern 310 and the dual brightness enhancement film 210. The polarization conversion layer 220 has a first refractive index n1 for light in a polarization direction parallel to the first direction 220a, and has a second refractive index n2 for light in a polarization direction parallel to the second direction 220b, the first direction 220a is perpendicular to the second direction 220b, and the first refractive index n1 is greater than the second refractive index n2.

In some embodiments, the angle between the first direction 220a and the first transmission axis 310a is 20 degrees to 40 degrees or 50 degrees to 70 degrees.

In some embodiments, the dual brightness enhancement film 210 of the display device 30 is replaceable, in other words, different dual brightness enhancement films 210 is used depending on the different requirement of wide viewing angle direction, therefore, the display device 30 having different wide viewing angle directions can be manufactured without changing the structure of the liquid crystal display panel 300.

Figure 8:
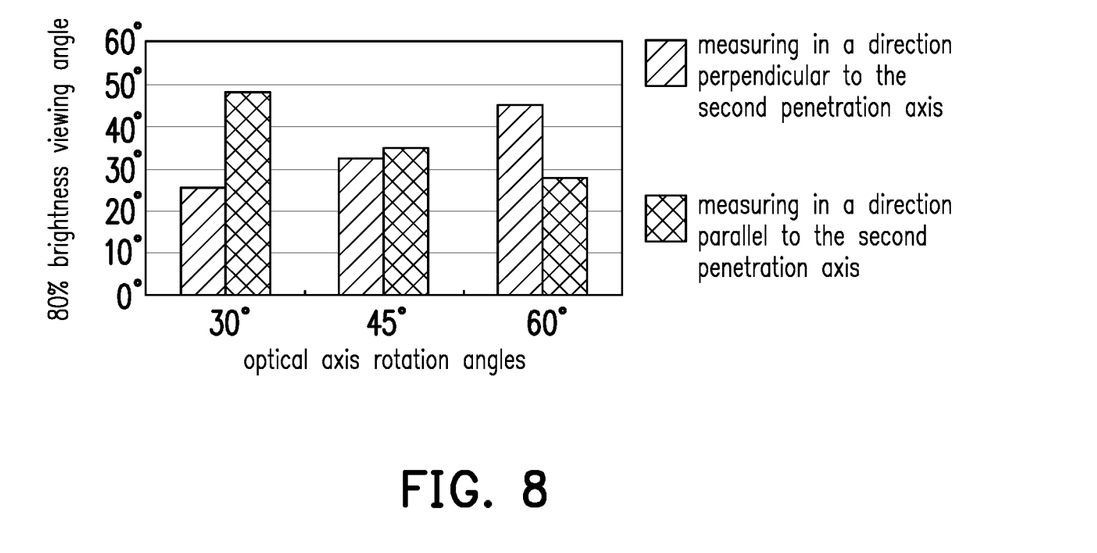
FIG. 8 is a bar chart of different optical axis rotation angles and 80% brightness viewing angle.

FIG. 8 is a bar chart of different optical axis rotation angles and 80% brightness viewing angle. The horizontal axis of FIG. 8 represents different optical axis rotation angles, the optical axis rotation angles refer to an angle between the first direction 220a and the first transmission axis 310a. The vertical axis of FIG. 8 shows the 80% brightness viewing angle, more specifically, the vertical axis of FIG. 8 shows the viewing angle at which the brightness remains 80% as the brightness at the center (or when angle of the viewing direction is 0 degree) is set to be 100%.

FIG. 8 measures the 80% brightness viewing angle of the display device in a direction parallel to the second transmission axis 210a and in a direction perpendicular to the second transmission axis 210a, respectively. The display device is, for example, the display device 30 of the embodiment of FIG. 6.

As can be seen from FIG. 8, the 80% brightness viewing angle of the display device changes as the angle between the second transmission axis 210a of the dual brightness enhancement film 210 and the first transmission axis 310a of the lower polarizing pattern 310 changes.

Figure 9:
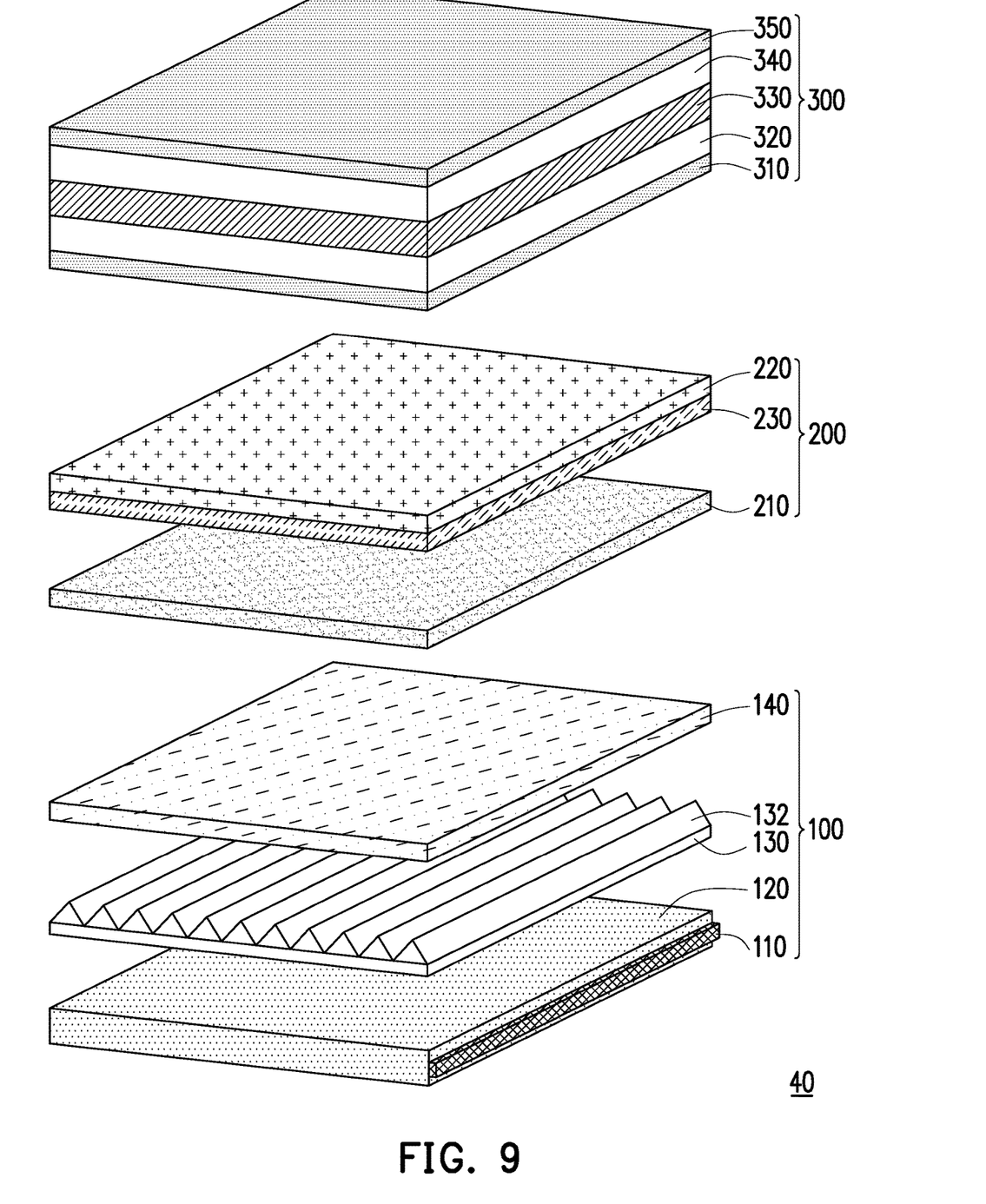
FIG. 9 is an exploded view of a display device in accordance with an embodiment of the present disclosure.

The 80% brightness viewing angle in a direction parallel to the second transmission axis 210a is greater when the optical axis rotation angle is 30 degrees. The 80% brightness viewing angle in a direction perpendicular to the second transmission axis 210a is greater when the optical axis rotation angle is 60 degrees. That is to say, as the optical axis rotation angle increases, the 80% brightness viewing angle in a direction parallel to the second transmission axis 210a decreases, and the 80% brightness viewing angle in the direction perpendicular to the second transmission axis 210a increases. As can be seen from FIG. 8, the display device 30 of the embodiment of FIG. 6 is applied to a straight extension installation or a horizontal extension installation, thereby obtaining a large viewing angle on the left and right sides in both situations. For example, the embodiment of FIG. 6 may be applied to a display device of a fine art work, through rotation of structures, the fine art work can be displayed straightly or horizontally. FIG. 9 is an exploded view of a display device in accordance with an embodiment of the disclosure. It should be noted that the embodiment of FIG. 9 adopts the reference numerals and part of the technical content from the embodiment of FIGS. 4 and 5, wherein the same or similar reference numerals refer to the same or similar elements, and the repeated description of the same technical content is omitted. For the description of the omitted part, reference may be made to the foregoing embodiment, which will not be described herein.

The main difference between the display device 40 of FIG. 9 and the display device 20 of FIGS. 4 and 5 is that the optical module 40 further includes a microlens 230.

The microlens 230 is located between the dual brightness enhancement film 210 and the polarization conversion layer 220. The microlens 230 and the polarization conversion layer 220 are bonded together, for example. The backlight module 100 includes a light bar 110, a light guide plate 120, a prism sheet 130, and a diffusion sheet 140. The light guide plate 120 is located at one side of the light bar 110. The prism sheet 130 is located on the light guide plate 120, and the prism sheet 130 has a plurality of prism structures 132 in the same direction as the light bar 110 extends. The diffusion sheet 140 is located on the prism sheet 130. In some embodiments, the backlight module 100 further includes other optical films, for example, the backlight module 100 further includes a Quantum Dot Enhancement Film (QDEF), a phosphor film, a diffuser film, a light guide film, a prism film, a Dual Brightness Enhancement Film (DBEF), a Diffraction Film or other optical film or combination of the above optical films. In some embodiments, the backlight module 100 is a direct type backlight module.

Figure 10:
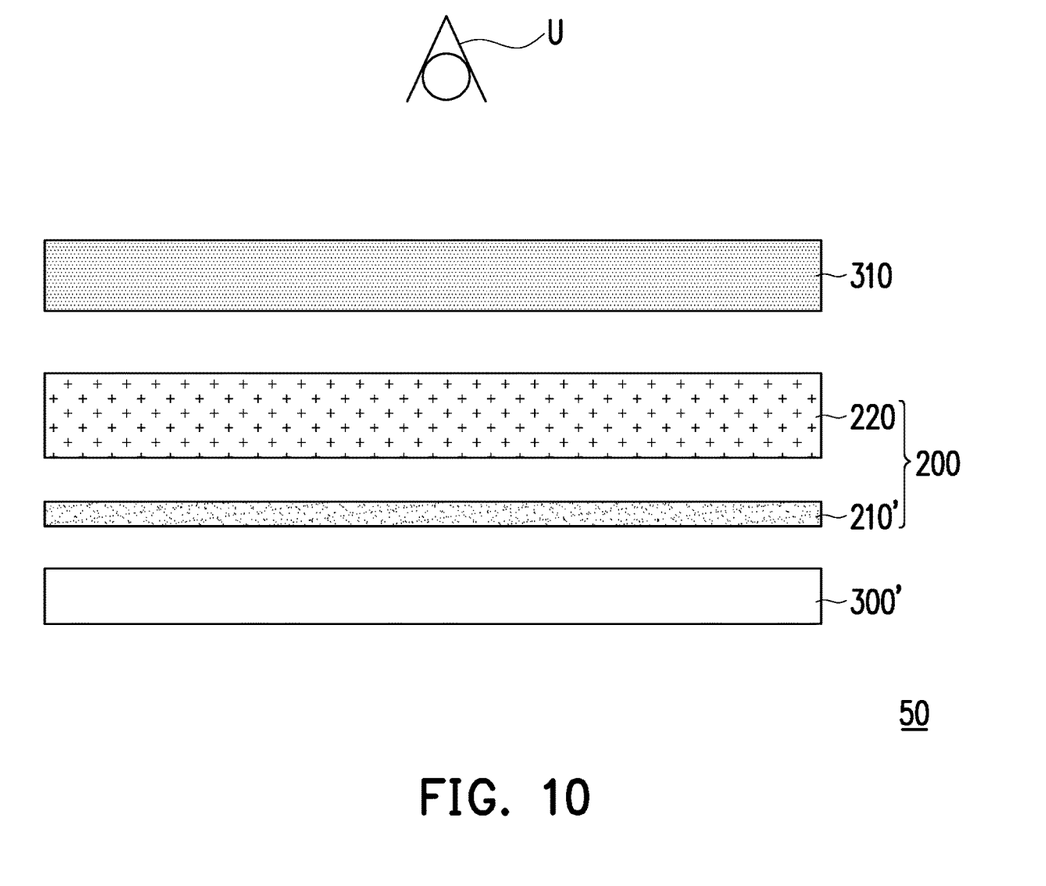
FIG. 10 is a cross-sectional schematic view of a display device in accordance with an embodiment of the present disclosure.

FIG. 10 is a cross-sectional schematic view of a display device in accordance with an embodiment of the present disclosure. It should be noted that the embodiment of FIG. 10 adopts the reference numerals and parts of the embodiment of FIGS. 1 and 2, wherein the same or similar reference numerals refer to the same or similar elements, and the repeated description of the same technical content is omitted. For the description of the omitted part, reference may be made to the foregoing embodiment, which will not be described herein.

The main difference between the display device 50 of FIG. 10 and the display device 10 of FIG. 1 and FIG. 2 is that the optical module 200 of the display device 50 of the present embodiment is disposed between the display panel 300' and the viewer U, whereas the optical module 200 of the display device 10 of the foregoing embodiment is disposed between the liquid crystal display panel 300 and the backlight module 100.

In this embodiment, the display device 50 includes a display panel 300', a lower polarizing pattern 310 (or a polarizing pattern), and an optical module 200. The lower polarizing pattern 310 is located on the display panel 300a, and having a first transmission axis 310a. The optical module 200 is located between the display panel 300a and the lower polarizing pattern 310, the first polarization direction, which is a polarization direction of the light after passing through the optical module 200, is different from the second polarization direction, which is a polarization direction of the light after passing through the lower polarizing pattern 310a. In other words, a first polarization direction of a light after passing through the optical module is different from a second polarization direction of a light after passing through the lower polarizing pattern.

The optical module 200 includes a polarizer 210' and a polarization conversion layer 220. Polarizer 210' has a second transmission axis, and the polarizer 210' is a dual brightness enhancement film or a polarizing film, for example, the polarizer 210' may be similar to the dual brightness enhancement film 210 of the previous embodiment. The polarization conversion layer 220 has a first refractive index n1 for light in a polarization direction parallel to the first direction 220a, and has a second refractive index n2 for light in a polarization direction parallel to the second direction 220b, the first direction 220a is perpendicular to the second direction 220b, and the first refractive index n1 is greater than the second refractive index n2.

In this embodiment, the optical module 200 is, for example, externally mounted on the display panel 300'. For example, this embodiment may be applied to dimming of windows, such as billboards on the mass transit or buildings, etc.

In this embodiment, the display panel 300' is a liquid crystal display panel, an organic light emitting diode display panel, an inorganic light emitting diode display panel, or other types of display panels.

In summary, the first polarization direction of light emitted by the backlight module of the embodiment of the present disclosure after passing through the optical module is different from the second polarization direction of the light after passing through the lower polarizing pattern, affecting the transmittance of the display device in the front view direction, reducing the brightness of the display device in the front view direction, and the aforementioned effects would gradually decrease as the angle of the viewing direction increases, which makes the display quality of the display device in large angle of the viewing direction less different from the display quality in the front view direction, thereby obtaining the characteristic of a wide viewing angle.

Although the disclosure has been disclosed by the foregoing embodiments, it shall not be deemed as limitation to the disclosure. Various modifications and variations can be made to the disclosed embodiments by those skilled in the art without departing from the scope or spirit of the disclosure. It is intended that the disclosure covers modifications and variations provided that they fall within the scope of the following claims and their equivalents.

What is claimed is:

1. A display device, comprising:
   a backlight module,
   a liquid crystal display panel, located on the backlight module, comprising:
      an array substrate;
      an opposite substrate;
      a display medium layer, located between the array substrate and the opposite substrate;
      an upper polarizing pattern, located on the opposite substrate; and
      a lower polarizing pattern, located on the array substrate and having a first transmission axis; and
   an optical module, located between the backlight module and the liquid crystal display panel, and comprising:
      a dual brightness enhancement film, the dual brightness enhancement film having a second transmission axis, wherein an angle between the second transmission axis and the first transmission axis is less than 5 degrees; and a polarization conversion layer, wherein the polarization conversion layer has a first refractive index for a light in a polarization direction parallel to a first direction, and has a second refractive index for a light in a polarization direction parallel to a second direction, the first direction is perpendicular to the second direction, and the first refractive index is greater than the second refractive index, wherein a first polarization direction of a light after passing through the optical module is different from a second polarization direction of a light after passing through the lower polarizing pattern.

2. The display device as described in claim 1, wherein an angle between the first direction and the first transmission axis is 12 degrees to 85 degrees or 95 degrees to 168 degrees.

3. The display device as described in claim 1, wherein the optical module further comprises:
 a microlens, located between the dual brightness enhancement film and the polarization conversion layer.

4. The display device as described in claim 1, wherein the second transmission axis is parallel to the first transmission axis.

5. The display device as described in claim 1, wherein the polarization conversion layer is located between the liquid crystal display panel and the dual brightness enhancement film.

6. A display device, comprising:
 a backlight module,
 a liquid crystal display panel, located on the backlight module, comprising:
  an array substrate;
  an opposite substrate;
  a display medium layer, located between the array substrate and the opposite substrate;
  an upper polarizing pattern, located on the opposite substrate; and
  a lower polarizing pattern, located on the array substrate and having a first transmission axis; and
 an optical module, located between the backlight module and the liquid crystal display panel, and comprising:
  a dual brightness enhancement film, the dual brightness enhancement film having a second transmission axis, wherein an angle between the second transmission axis and the first transmission axis is greater than 85 degrees; and
  a polarization conversion layer, wherein the polarization conversion layer has a first refractive index for a light in a polarization direction parallel to a first direction, and has a second refractive index for a light in a polarization direction parallel to a second direction, the first direction is perpendicular to the second direction, and the first refractive index is greater than the second refractive index, wherein a first polarization direction of a light after passing through the optical module is different from a second polarization direction of a light after passing through the lower polarizing pattern.

7. The display device as described in claim 6, wherein the second transmission axis is perpendicular to the first transmission axis.

8. The display device as described in claim 6, wherein an angle between the first direction and the first transmission axis is 20 degrees to 40 degrees or 50 degrees to 70 degrees.

* * * * *